United States Patent Office 3,222,331
Patented Dec. 7, 1965

3,222,331
SULFUR-VULCANIZABLE INTERPOLYMERS COMPRISING AT LEAST ONE ALPHA-OLEFIN AND A POLYVINYLCYCLOALKANE AND A PROCESS FOR PREPARATION
Edward W. Duck and Rinke Berkenbosch, both of Amsterdam, Netherlands, assignors to Shell Oil Company, New York, N.Y., a corporation of Delaware
No Drawing. Filed Apr. 25, 1962, Ser. No. 189,961
Claims priority, application Netherlands, July 26, 1961, 267,544
8 Claims. (Cl. 260—80.5)

This invention relates to the copolymerization of alpha olefins with polyvinyl cycloalkanes. More particularly, it relates to the preparation of sulfur-vulcanizable copolymers.

Copolymerization in which one or more alpha-monoolefins, e.g., ethylene or propylene, are used may be carried out with catalysts of the Ziegler of Natta types. However, products composed entirely of alpha-olefin units are substantially saturated and therefore are not readily subject to vulcanization except by the use of peroxides. The use of the latter entails certain technical and economic disadvantages: they are expensive and the products so derived have objectional odors.

Means have been investigated for the copolymerization with alpha olefins of certain open chain diolefins.

It is an object of the present invention to improve the process for the polymerization of alpha olefins. It is another object of this invention to provide a process for the preparation of sulfur vulcanizable alpha olefins. It is a particular object of the invention to provide not only the process for preparation but the sulfur vulcanizable polymers per se. Other objects will become apparent during the following detailed description of the invention.

Now, in accordance with the present invention, sulfur vulcanizable copolymers of alpha olefins comprise those in which from about 1 to about 30 mol percent of the bound monomers in the copolymers are polyvinyl monocycloalkanes, the copolymers having 2–25 double bonds per 1,000 carbon atoms. Still in accordance with the present invention, a process is provided whereby an alpha olefin having from two to eighteen carbon atoms per molecule and being an unsaturated straight chain monoolefin is copolymerized in the presence of a polymerization catalyst with a polyvinyl substituted cycloalkane to produce the new copolymers of the invention. More particularly, such copolymers are preferably polymerized in the presence of catalysts of the Ziegler or Natta type.

Suitable alpha monoolefins are for example, ethylene, propylene, butene-1, styrene, hexene-1, octene-1 and mixtures thereof. Preferably, the mono alpha olefins have from 2 to 6 carbon atoms each and still more preferably mixtures of ethylene with either propylene or butene-1 are employed. In order to provide a sulfur vulcanizable copolymer, the above-described unsaturated straight chain monoolefins are copolymerized with polyvinyl cycloalkanes. These may be either monocyclic or polycyclic, although the monocyclic are preferred. Typical polyvinyl monocyclic alkanes are as follows:

1,2-divinyl cyclohexane
1,3-divinyl cyclohexane
1,4-divinyl cyclohexane
1,2-divinyl cyclopentane
1,3-divinyl cyclopentane
1,2-divinyl-4-methyl-cyclohexane
1,4-divinyl-2-methyl-cyclohexane
1,2,4-trivinyl cyclohexane
1,3,5-trivinyl cyclohexane
1,2,3-trivinyl cyclohexane
1,2,4-trivinyl cyclopentane
1,2,5-trivinyl cyclopentane
1,2,4-trivinyl-5-methyl-cyclohexane
1,2,5-trivinyl-4-methyl-cyclohexane In addition to or in place of the vinyl substituted monocycloalkanes, polyvinyl polycycloalkanes may be utilized. These are usually mixed di or trivinyl substituted polycycloalkanes, the mixtures usually comprising isomers derived by a simple vinyl substituting mechanism. Typical polycycloalkanes from which mixed di or trivinyl substituted alkanes may be derived are as follows:

Carane
Pinane
Camphane
Decalin
Perhydrophenanthrene
Cholane

While the amount of vinyl substituted cycloalkanes may vary from about 1 to about 30 mol percent of the bound monomers in the coplymers formed according to the present invention, it is preferred that they constitute between about 2 and about 10 mol percent of the average copolymers. Particularly suitable vinylcycloalkanes may be obtained by heating cyclododecatriene (1,5,9) to a temperature between 300 and 650° C. and separating the lower boiling reaction product from the starting material by distillation.

The copolymers of the present invention may be prepared by the use of catalysts generally known as coordination catalysts. These are made from components of two types; component A comprises compounds of the transition heavy metals of groups IV, V, and VI beginning with titanium, vanadium and chromium and component B comprises organometallic compounds and hydrides of groups I, II, and III of the Periodic System. The compounds of component A are preferably halides, oxy halides, and alcoholates, the preferred metals being titanium and vanadium. The metals of component B are preferably lithium, sodium, magnesium and aluminum and the organic portions are preferably alkyl radicals. In these organo metallic compounds, the valences of the metal may be partially satisfied by halogen or alkoxyl, provided of course that at least one bond connects the metal with an organic radical. Mixtures of two or more compounds of the types described above may often be used to an advantage. These catalysts per se are not the subject of the present invention.

As is well known, these catalysts must be used in the virtual absence of oxygen, water or other materials with which they react, and for this reason solvents in which they are generally used are greatly limited, the preferred one being the saturated aliphatic and hydroaromatic hydrocarbons and certain non-reactive halogen compounds such as tetrachloroethylene and chlorobenzene. These solvents conveniently serve as solvents for the polymerization of the olefins which for example is usually carried out in the dilute suspension of the catalyst.

The polymerization normally will be carried out at ordinary temperatures and pressures although it is usually convenient to allow the temperature to rise spontaneously to from 50 to 60° C. due to the heat of the reaction. The rate of the reaction may be increased by the use of increased pressures, e.g., up to 1000 atmospheres or above, or by increased temperatures up to about 150° C., although it is to be understood that elevated temperatures and pressures are not required. When found desirable, the polymerization may be carried out at lower temperatures and pressures.

Catalysts suitable for the present process can be obtained, for instance, by using any one of the following combinations of catalyst-forming components.

(a) A vanadium oxyhalide, for instance, $VOCl_3$ or $VOCl_2$, together with a compound of the type $AlR_n$(halogen)$_{3-n}$, in which R stands for a hydrocarbon radical and $n$ is 1–3 for instance an alkylaluminum sesquihalide, such as Al isobutylsesquichloride.

(b) A vanadium trihalide, for instance $VCl_3$, together with a compound of the type $AlR_2$(halogen) or $AlR_3$, in which the symbols R represent equal or different hydrocarbon radicals, for instance, $Al(C_2H_5)_2Cl$.

(c) Titanium trihalide, for instance $TiCl_3$, together with a compound of the type $AlR_2(OR)$ or $AlR_3$, in which the symbols R again stand for equal or different hydrocarbon radicals, for instance, $Al(C_2H_5)_2(OC_2H_5)$.

Preferably, combinations (a) or (b) are applied.

Insofar as a trialkyl compound is used as the catalyst-forming compound in the combinations mentioned above ((a)–(c), incl.), the aluminum trialkyls which contain more than 5 carbon atoms, for instance aluminum tri-n.hexyl or aluminum tri-n.decyl, are preferred.

In all the above-mentioned types of aluminum compounds R can represent, besides an alkyl group, a cycloalkyl group or an aromatic radical.

As the diluent in the process according to the invention the usual types may be used, both aliphatic and aromatic hydrocarbons, as well as chlorinated hydrocarbons, for instance isooctane, benzene and tetrachloroethane.

It is a preferred practice to mix the polyvinyl cycloalkane with one of the catalyst components prior to admixture with the remaining catalyst component and the copolymerizable olefin monomer.

The catalyst components should be employed in molar ratios varying from about 1:10 and 10:1, preferably from about 1:3 and 3:1.

Ordinarily, softer products are obtained from the olefins having longer carbon chains and from vinyl substituted cycloalkanes of higher molecular weight. It is often advantageous to employ two monoolefins, particularly where they occur in mixtures normally or where particular properties are desired. For example, the mixture of ethylene and propylene (or butene-1) in amounts of about 50–80 mol percent of ethylene in the final polymer is particularly useful in giving products with elastomeric properties of the kind desired.

The monomers may be added gradually to the catalyst suspension or solution or they may all be added entirely at the start of the reaction. Alternatively, one or more may be added at the start and the balance may be added gradually throughout the polymerization. Additional catalysts may be injected during the reaction if found to be desirable. All of the processes including making the catalyst and isolating and purifying the product may be carried out batchwise or continuously.

The copolymers of the present invention may be milled and compounded satisfactorily in the same manner as milling and compounding of rubbers and the known synthetic elastomers, and may be cured with sulfur or sulfur-type vulcanizing agents in the same manner as rubber. As with rubber, the tensile properties are improved by incorporating carbon black and other compounding ingredients.

The following examples illustrate the preparation and vulcanization of the subject copolymers.

Example I

Some copolymerization experiments were carried out using as the monomers ethene, propene and a mixture of 1,2,4- and 1,3,5-trivinyl cyclohexane (TVCH) obtained by heating cyclododecatriene-(1,5,9) to about 450° C. and separating the lower-boiling reaction product from the base material by distillation and purified by treatment with $Al(C_2H_5)_3$ and percolation over $AlO_3$. The copolymerizations were effected in the diluents listed in Table I and with the aid of $VOCl_3$ and ethylaluminum sesquichloride as the catalyst-forming components.

In all the experiments the TVCH was added to a concentrated solution of $VOCl_3$ in the diluent, after which the solution was diluted with the same diluent. Then, consecutively, while the mixture was thoroughly stirred, the temperature was raised to 60° C., a gaseous feed consisting of 30% m. of ethene and 70% m. of propene, was passed through and a concentrated solution of ethylaluminum sesquichloride in the diluent was admixed. The total amount of diluent used was invariably 300 milliliters. The amounts of catalyst-forming component used for the polymerizations were, per liter of diluent, 10 millimoles of $VOCl_3$ and 20 millimoles of $Al(C_2H_5)_{1\,1/2}Cl_{1\,1/2}$. The copolymerizations started at once when the ethylaluminum sesquichloride was admixed. The rate of throughput of the ethene/propene mixture was adjusted in such a manner that the exit gas amounted to about 30% v. of the feed. Under these conditions the copolymerizations were continued for one hour. Then 5 to 10 ml. of a mixture of hydrochloric acid and ethanol was added to inactivate the catalyst. The contents of the reactor were subsequently poured into an equal amount of ethanol. After it had been separated, the copolymer was washed out with ethanol and dried in vacuo under nitrogen at 60° C. The yields, compositions and intrinsic viscosities (I.V.'s) measured at 135° C. in decalin of the copolymers thus obtained, are recorded in Table I. For comparison the results of a corresponding copolymerization without applying TVCH are also included (experiment No. 1).

TABLE I

| Exp. No. | Diluent | Amount of TVCH, ml. per liter of diluent | Copolymers ||||
|---|---|---|---|---|---|---|---|
| | | | Yield, g./liter | I.V. | Solubility in cold hexane, percent | Propene content, percent m. (infrared analysis) | Number of double bonds per 1,000 C. atoms (infrared analysis) |
| 1 | Iso-octane | 0 | 25 | 4.1 | 99 | 39 | 0.1 |
| 2 | do | 10 | 30 | 3.7 | 81 | 46 | 2.7 |
| 3 | do | 25 | 26 | 3.1 | 72 | 41 | 4.9 |
| 4 | do | 50 | 30 | 2.4 | 52 | 36 | 11.0 |
| 5 | Tetrachloroethane | 25 | 36 | 1.6 | 65 | 41 | 5.1 |

Example II

Experiment No. 3 of Example I was repeated, with the difference that the TVCH was added not to the $VOCl_3$ solution but to the ethylaluminum sesquichloride solution, the resultant mixture being maintained after dilution at 60° C. for 15 minutes, after which the ethene/propene was passed through, the $VOCl_3$ solution only being added after that. Of the copolymer thus prepared the yield was 24 grammes per liter, the I.V. 3.7, the solubility in cold hexane 53% w., the propene content 43% m. and the number of double bonds per 1,000 carbon atoms 5.3.

Example III

Experiment No. 3 of Example I was repeated, with the difference that instead of the $VOCl_3$ solution the reaction product obtained at 170° C. from 5 millimoles per liter of $VCl_4$ annd 2.5 millimoles per liter of $Al(C_2H_5)_2Cl$, instead of 20 millimoles per liter of Al(C$_2$H$_5$)$_{1\,1/2}$Cl$_{1\,1/2}$ 10 millimoles per liter of Al(C$_2$H$_5$)$_2$Cl and instead of 300 milliliters of isooctane 500 milliliters of isooctane was used, and that the duration of polymerization was ½ hour instead of 1 hour. In this experiment a polymer yield of 36 g. per liter was obtained, the I.V. of the copolymer being 4.0, its solubility in cold hexane 46% w., its propene content 46% m. and the number of double bonds per 1000 carbon atoms 6.6.

*Example IV*

The terpolymers obtained in Experiments 3 and 4 of Example I (terpolymer 3 and terpolymer 4) were vulcanized for one hour at 150° C., the following recipe being applied; copolymer 100, carbon black (HAF) 50, zinc oxide 3, stearic acid 2, tellurium diethyldithiocarbamate 1.5 and sulfur 2 parts by weight. The vulcanization results are presented in Table II, in which, for comparison, the results are also given of a vulcanization of the ethene/propene polymer carried out according to the same recipe, which was obtained in experiment 1 of Example I (copolymer).

TABLE II

| Vulcanization Results | Copolymer 1 | Terpolymer 3 | Terpolymer 4 |
|---|---|---|---|
| Tensile strength, kg./cm.$^2$ | 24 | 92 | 81 |
| Elongation at rupture, percent | 899 | 669 | 581 |
| 300% modulus, kg./cm.$^2$ | 15 | 40 | 41 |

We claim as our invention:

1. Sulfur-vulcanizable unsaturated elastomeric random copolymers of at least one terminally unsaturated straight chain mono-olefin containing 2-6 carbon atoms per molecule and 2.5-10 mol percent of a trivinyl monocycloalkane, the cycloalkane ring having 5-6 carbon atoms in the ring, the copolymers having 2-25 double bonds per 1,000 carbon atoms.

2. Sulfur-vulcanizable unsaturated elastomeric random copolymers of at least one terminally unsaturated straight chain mono-olefin containing 2-4 carbon atoms per molecule and 2.5-10 mol percent of a trivinyl monocyclohexane, the copolymers having 2-25 double bonds per 1,000 carbon atoms.

3. Sulfur-vulcanizable unsaturated elastomeric random terpolymer of ethylene, propylene and 2.5-10 mol percent of a trivinyl monocyclohexane, the terpolymer having 2-25 double bonds per 1,000 carbon atoms.

4. A terpolymer according to claim 3 having an intrinsic viscosity of 0.5-5.0, a solubility in cold hexane of 50-85% by weight, and 2-25 double bonds per 1000 carbon atoms.

5. The process of preparing a copolymer according to claim 1, in which a catalyst having components A and B is utilized, wherein the catalyst is selected from the group consisting of:

| Component A | Component B |
|---|---|
| A vanadium oxyhalide with an aluminum alkyl halide; | |
| A vanadium trihalide with an aluminum alkyl halide; | |
| A vanadium trihalide with an aluminum trialkyl; | |
| A titanium trihalide with an aluminum alkyl alkoxide; and | |
| A titanium trihalide with an aluminum trialkyl, | | the steps comprising:

(1) admixing the trivinyl monocycloalkane with one of the catalyst components;
(2) thereafter mixing therewith the terminally unsaturated monoolefin and the second catalyst component;
(3) randomly copolymerizing the monomers in an inert medium;
(4) and isolating the copolymer from the inert medium.

6. A process according to claim 5 wherein the catalyst comprises a combination of a compound of a heavy transition metal of Groups IV, V and VI of the Periodic Table and an organometallic compound B of Groups I, II and III of the Periodic Table, said compounds being utilized in a molar ratio between 1:10 and 10:1.

7. A process according to claim 6 wherein the trivinyl monocycloalkane is mixed with one of the catalyst compounds prior to admixture with the second catalyst compound and the mono-olefin.

8. A process according to claim 6 wherein the catalyst comprises a mixture of a vanadium oxyhalide and an aluminum alkyl halide.

References Cited by the Examiner

UNITED STATES PATENTS 2,933,480  4/1960  Gresham et al. _____ 260—80.5

FOREIGN PATENTS 1,065,413  9/1959  Germany.

JOSEPH L. SCHOFER, *Primary Examiner.*

JOSEPH R. LIBERMAN, *Examiner.*